(12) United States Patent
Phuong et al.

(10) Patent No.: US 10,129,232 B1
(45) Date of Patent: Nov. 13, 2018

(54) SECURE INTERACTIVE DEBUG

(71) Applicant: CISCO TECHNOLOGY, INC., San Jose, CA (US)

(72) Inventors: Scott Phuong, Sunnyvale, CA (US); Jake M. Troychak, Sherwood, OR (US); Zachary Weil Lovoy, San Jose, CA (US); Vinay Sheshadri, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 223 days.

(21) Appl. No.: 14/815,729

(22) Filed: Jul. 31, 2015

(51) Int. Cl.
*H04L 29/06* (2006.01)
*G06F 11/36* (2006.01)

(52) U.S. Cl.
CPC .......... *H04L 63/08* (2013.01); *G06F 11/3664* (2013.01); *H04L 63/102* (2013.01)

(58) Field of Classification Search
CPC ...................................... H04L 63/08
USPC ............................................. 726/4
See application file for complete search history.

(56) References Cited

U.S. PATENT DOCUMENTS

| | | | | |
|---|---|---|---|---|
| 6,353,891 B1 * | 3/2002 | Borella | ................... | G06F 21/33 726/1 |
| 8,301,897 B2 | 10/2012 | Turner | | |
| 2001/0047282 A1 * | 11/2001 | Raveis, Jr. | ......... | G06Q 10/1095 705/7.19 |
| 2004/0128523 A1 * | 7/2004 | Fujioka | ................... | G06F 21/72 713/189 |
| 2010/0199077 A1 * | 8/2010 | Case | ................... | G06F 11/3656 713/1 |

OTHER PUBLICATIONS

"Challenge-Response authentication," Wikipedia, Jun. 24, 2015, 6 pages; https://en.wikipedia.org/w/index.php?title=Challenge—response_authentication&oldid=667476723.
Microsoft, "Security During Kernel-Mode Debugging," Jul. 28, 2015, 1 page; https://msdn.microsoft.com/en-us/library/windows/hardware/ff554775(v=vs.85).aspx.

(Continued)

*Primary Examiner* — Jacob Lipman
(74) *Attorney, Agent, or Firm* — Polsinelli PC

(57) ABSTRACT

A method for ensuring secure access by a debugger to a privileged debug service for trouble shooting a product of a customer during a debug session is disclosed. Secure access is provided via an intermediate SID server. The method includes invoking a secure login process for accessing the privileged debug service, resulting in generation of a challenge string to be provided to the SID server upon determining that the customer has authenticated and has the rights for granting access to the privileged debug service. The method also includes receiving from the debugger a response string indicating that the debugger has successfully authenticated with the SID server, validating the response string, and providing the debugger with access to the privileged debug service by receiving input from the debugger indicating one or more commands/actions to be executed on the privileged debug service and executing the indicated commands/actions on the privileged debug service.

20 Claims, 3 Drawing Sheets

(56) References Cited

OTHER PUBLICATIONS

Microsoft, "Security During Remote Debugging," Jul. 28, 2015, 1 page; https://msdn.microsoft.com/en-us/library/windows/hardware/ff554788(v=vs.85).aspx.
Microsoft, "Security During User-Mode Debugging," Jul. 28, 2015, 1 page; https://msdn.microsoft.com/en-us/library/windows/hardware/ff554793(v=vs.85).aspx.

* cited by examiner

SECURE INTERACTIVE DEBUG

TECHNICAL FIELD

This disclosure relates in general to the field of trouble shooting technical issues of products and, more particularly, to techniques for ensuring secure access by a debugger to a privileged debug service for trouble shooting a product of a customer during a privileged debug session.

BACKGROUND

Software engineers or developers have been for the longest time trying to appropriately balance between software security and customer support. In countless scenarios, customer support features and functions often trump security, resulting in products that lack security. Other times, the design implements very weak security in the form of obscurity or hidden backdoor implementations. In a few scenarios, security takes higher priority resulting in products for which providing any support services by the manufacturer support teams is difficult, resulting in poor customer satisfaction or degradation of manufacturer's reputation.

As more and more devices connect to the Internet through the Internet of Things (IoT) or Internet of Everything (IoE) initiatives, and as cyberwar or cyber criminals strengthen in human and digital resources, finances and sophistication, it becomes crucial that the balance between customer support and security reaches the point where neither aspect is compromised and both aspects are strengthened and improved continually.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
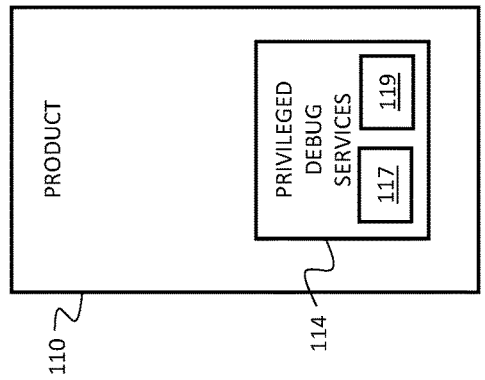
FIGS. 1A and 1B are simplified schematic diagrams illustrating a network environment in which embodiments of the present disclosure may be implemented.
Figure 1A:
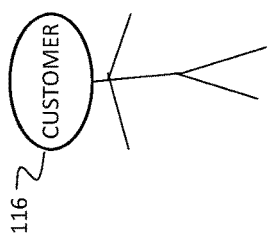

One aspect of the present disclosure provides a computer-implemented method, referred to herein as an "Secure Interactive Debug (SID) method," for ensuring secure access by a debugger to a privileged debug service (also sometimes referred to herein as a "privileged debug resource" or simply "privileged resource") for trouble shooting a product of a customer during a privileged debug session, the secure access provided via an intermediate functional (logical) entity referred to herein as a "SID server." At least a part of the method could be implemented by a functional entity referred to herein as a "SID client." At least a part of the method could be implemented by a SID server. In various embodiments, each of the SID server and the SID client could be implemented within any network element or distributed among a plurality of network elements associated with the debugger and the customer, respectively. Typically, the SID client would be included within or associated to (i.e., not included within, but e.g. be communicatively connected to) the product being tested (i.e. be in a domain of the customer), while the SID server would be included with or associated with the domain of the debugger, where, as used herein, the term "debugger" may refer either to a machine or a human performing trouble shooting of a product (the human could e.g. be a representative of a company that produced the product that now needs troubleshooting).

In one embodiment, the SID method includes a step of, in response to receiving, from the customer, a first input comprising a command or an action to invoke a secure login process for the privileged debug session, invoking the secure login process for accessing the privileged debug service. The method also includes steps, performed as a part of the secure login process, of requesting that login credentials of the customer are provided to the product, receiving from the customer a second input comprising the login credentials of the customer, authenticating the customer using the login credentials of the customer, determining whether the customer has rights for granting access to the privileged debug service upon successful authentication of the customer, and generating a challenge string to be provided to the SID server upon positive determination. The method also includes steps of receiving, from the debugger (potentially via the input by the customer), a response string indicating that the debugger has successfully authenticated with the SID server for accessing the privileged debug service, and validating the response string. The method further includes a step, performed upon successful validation, of providing the debugger with access to the privileged debug service by receiving input from the debugger indicating one or more commands and/or actions to be executed on the privileged debug service and executing the indicated one or more commands and/or actions on the privileged debug service.

Some advantages of the SID method include flexibility, significant level of security without sacrificing customer support and product development, and applicability to different products and different deployment scenarios.

As will be appreciated by one of ordinary skill in the art, aspects of the present disclosure, in particular the functionality of the SID server and SID client described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing routers, switches, various control nodes, etc.) or be stored upon manufacturing of these devices and systems.

EXAMPLE EMBODIMENTS

Exemplary Setting for Trouble Shooting of a Product

For purposes of illustrating the techniques implemented by the SID server and the SID client, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

An exemplary network in which embodiments of the present disclosure can be implemented is illustrated in FIG. 1A, showing that the network environment 100 may be viewed as comprising a "customer side" 102 and a "debugger side" 104. Segregation into the customer side 102 and the debugger side 104 implies different administrative authorities and policies of different entities, e.g. of an entity that purchased a product that later needs to be trouble shot and an entity that manufactured (or otherwise provided) the product, which could be different organizations or different parts of a single organization.

The customer side 102 typically includes the actual product to be trouble shot, shown in FIG. 1A are product 110, as well as a customer 116, typically a person or a group of people, overseeing the trouble shooting. The product 110 may be any product that may need to be tested to resolve technical issues in operation of the product. Examples of the product 110 include, but are not limited to, servers, routers, switches, network controllers, storage controllers, storage devices, Cisco WebEx products, set-top boxes, laptops, desktops, workstations, chassis manager, power supplies, Internet Protocol (IP) phones, security devices, wireless routers, and communication devices.

As shown in FIG. 1A, the product 110 includes privileged debug services 114, where the term "privileged" is used to indicate that these services provide/require super level access to the product. While such privileged debug services 114 are typically product-specific and can be of any form or function deemed appropriated by the engineers and designers of the product 110, they commonly offer a super-user shell such as e.g. root user in a Linux shell.

At its core, SID techniques described herein employ a challenge and response methodology to determine if the users are authorized to access the product's privileged debug services 114. If they are, the product's privileged debug services are granted, exposed or enabled. The privileged debug services 114 often implement proprietary trouble shooting techniques and, therefore, are often reserved for appropriate engineers or support/trouble shooting personnel of the manufacturer of the product 110.

The debugger side 104 typically includes a debugger 126, which, as described above, could be either a machine (i.e. computer-implemented debugger) or one or more humans, equipped to carry out trouble shooting of the product 110.

Proposed Solution for Ensuring Secure Access to Privileged Debug Services

Embodiments described herein aim to provide a security-based customer support infrastructure that aids in customer's technical issue resolution where detailed technical support collection was not sufficient in root-causing the issue. To that end, a method is provided (SID method) that allows ensuring secure access by a debugger to a privileged debug service for trouble shooting a product of a customer during a privileged debug session (also referred herein as "SID process", "SID method" or simply "SID").

Figure 1B:
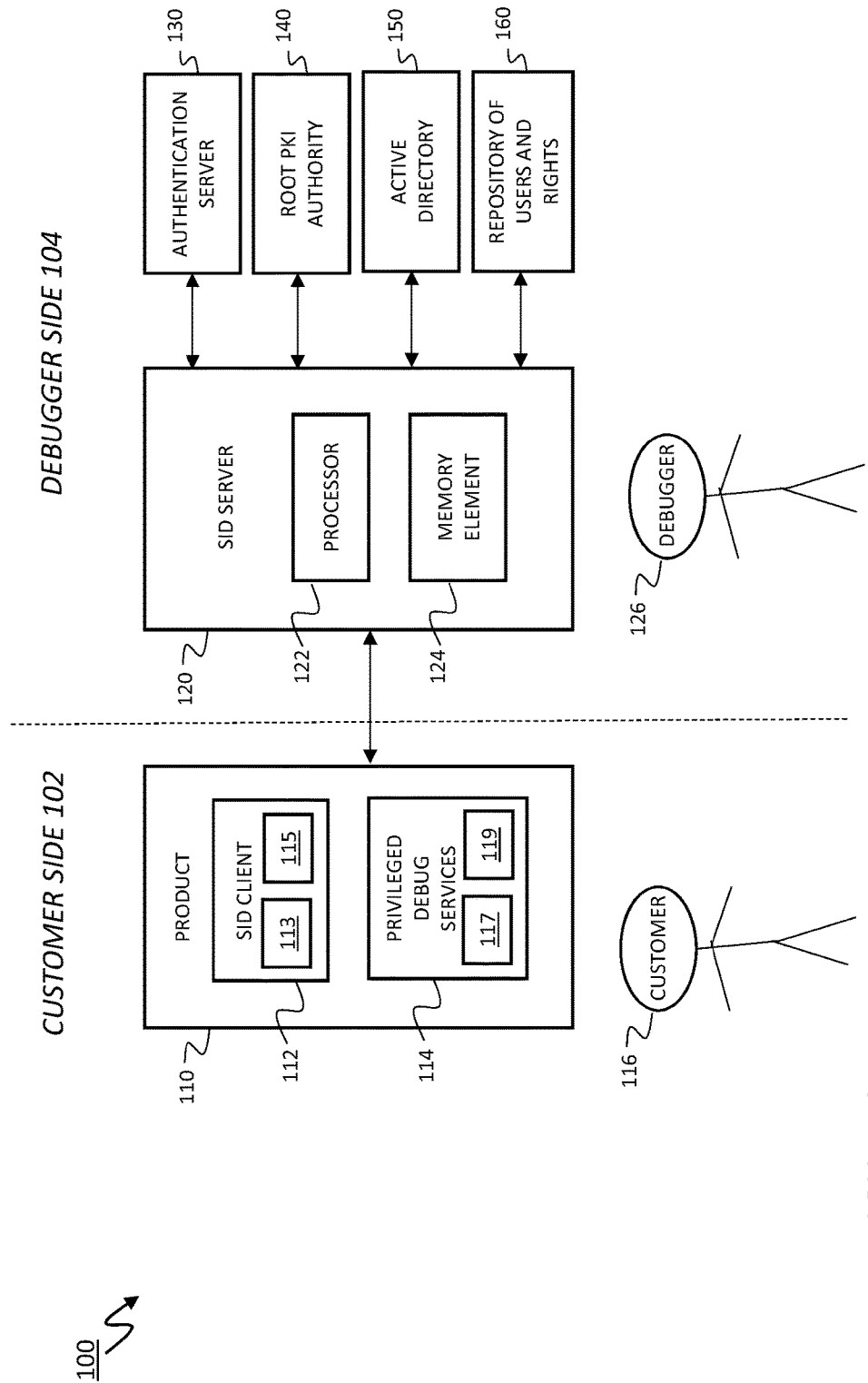

Continuing with the example of the network environment 100 illustrated in FIG. 1A, FIG. 1B illustrates a network environment 100 which, in addition to the elements shown in FIG. 1A (the description for which, therefore, is not repeated here), also includes other elements that allow carrying out the SID methods as described herein. In particular, as shown in FIG. 1B, the debugger side 104 may be considered to include a SID server 120. As shown, the SID server 120 may include at least one processor 122 and at least one memory element 124, along with any other suitable hardware to enable its intended functionality of SID. Optionally, various network elements, services, and repositories may be associated with or included within the SID server 120, including, but not limited to an authentication server 130, root Public Key Infrastructure (PKI) authority (also sometimes referred to as a "certificate authority") 140, an active directory 150, and a repository 160 storing information on users and their rights.

In an embodiment, the elements shown on the debugger side 104 may be viewed as elements under a single technical administration (i.e. within a single domain, e.g. that of the manufacturer of the product 110) and may comprise any set of network elements, such as e.g. routers, switches, and controllers, as well as hosts connected thereto, that may communicate with one another by e.g. routing packets using a common instance of a routing protocol and by referring to certain common metrics to define a routing domain governed by the particular instance of the routing protocol. In particular, preferably, the root PKI authority server 140 and the SID server 120 reside or belong to a domain of a single company or entity.

The authentication server 130 is used to authenticate a debugger by e.g. checking login credentials such as username and password of the debugger against information stored in the active directory 150.

The root PKI authority 140, such as e.g. Abraxas services, may be considered as the root of trust for cryptographic functions such as but not limited to signing, encryption, decryption or for scenarios where a security feature or function employs Rivest-Shamir-Adleman (RSA) cryptography where the private key portion must be kept safe and in the debugger's domain. The SID process described herein may use root PKI authority 140 as the root of trust for its challenging and response process.

The active directory 150 may be configured to store names as well as login credentials of various debuggers. During the secure login process, a debugger may be authenticated against information stored in the active directory 150.

The repository 160 may be configured to store information on users on the debugger side (i.e. individual representatives of a debugger organization, simply referred to as "debuggers" herein) and their rights for accessing the privileged debug services 114.

In some embodiments, the SID server 120 may be implemented as a designated and customized Linux server that authorized SID users may access and providing strictly SID features and nothing else (i.e. a regular representative of the debugger's organization may not log in to such a server and use it for other purposes, such as e.g. compiling code).

Although only a single SID server 120 is shown in FIG. 1B, in order to provide redundancy and to ensure continuous support in case one SID server is down, malfunctioning, or inoperative in some manner, a plurality of such SID servers 120 may be implemented.

On the customer side, the SID method described herein is performed by a SID client 112. Similar to the SID server, the SID client 112 may include at least one processor 113 and at least one memory element 115, along with any other suitable hardware to enable its intended functionality in the SID method. Analogously, the privileged debug services 114 may also include at least one processor 117 and at least one memory element 119, along with any other suitable hardware to enable its intended functionality in the SID method. Similar to the SID server, the SID client 112 may be communicatively connected to one or more repositories and servers (not shown in FIG. 1B), e.g. those used in authentication and authorization of the customer. For example, the SID client may be communicatively connected to a repository configured to store information on users on the customer side (i.e. individual representatives of a Customer organization, simply referred to as "customers" herein) and their rights for granting access to the privileged debug services 114.

Referring, in the following, to "SID" or "SID method" implementing certain steps or features is to be understood as steps or features performed by the SID server or/and the SID client, typically depending on whether the steps/features are performed, respectively, on the debugger side or on the customer side.

In various embodiments, elements of FIGS. 1A-1B may be coupled to one another through one or more interfaces employing any suitable connections (wired or wireless), which provide viable pathways for network communications. Additionally, one or more of these elements of FIGS. 1A-1B may be combined, divided, or removed from the architecture based on particular configuration needs. Network environment 100 and in particular SID server 120 and SID client 112 may include a configuration capable of transmission control protocol/internet protocol (TCP/IP) communications for the transmission and/or reception of packets in the network. Network environment 100 and in particular SID server 120 and SID client 112 may also operate in conjunction with a user datagram protocol/IP (UDP/IP), any other suitable protocol, or any suitable combination thereof where appropriate and based on particular needs.

Although not shown in FIG. 1B, one or both of the SID client 112 and the SID server 120 may provide a graphical user interface (GUI) for interacting with the customer and the debugger, respectively.

Furthermore, in various embodiments, various functionalities described herein may be offloaded to external devices, not specifically described herein. For example, customer authentication can be offloaded, the SID client could be implemented on a Universal Serial Bus (USB) flash device that the product can use, and so on.

Figure 2:
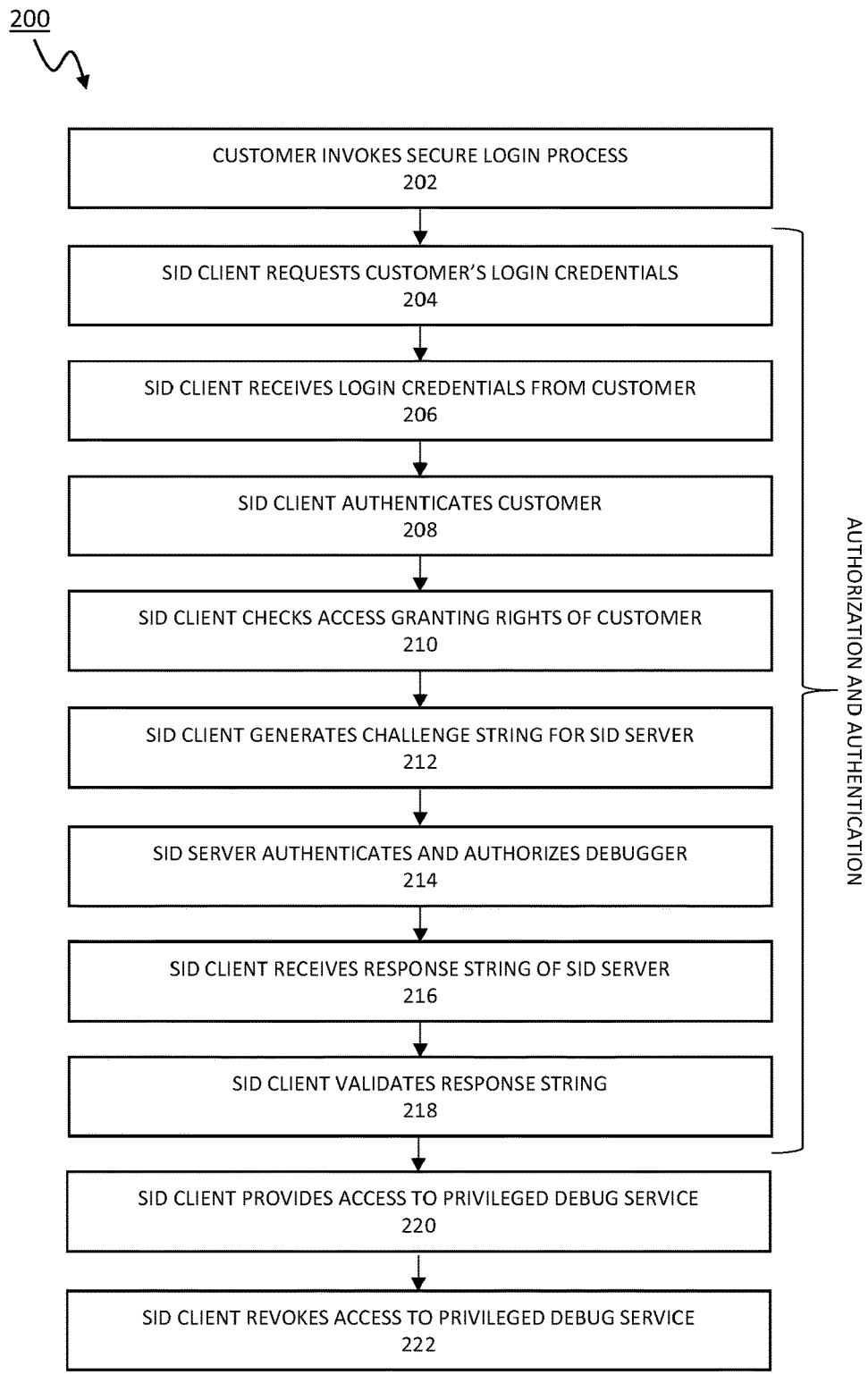
FIG. 2 is a flowchart of method steps illustrating a SID process for ensuring secure access by a debugger to a privileged debug service for trouble shooting a product of a customer during a privileged debug session, according to some embodiments of the present disclosure.

FIG. 2 is a flowchart 200 of method steps illustrating a SID process for ensuring secure access by a debugger to a privileged debug service for trouble shooting a product of a customer during a privileged debug session, according to some embodiments of the present disclosure. While the method steps illustrated in FIG. 2 are explained with reference to elements shown in FIGS. 1A-1B, any network elements configured to perform these steps are within the scope of the present disclosure.

The SID method includes many features and functions to form a robust security system to protect both the customer and the debugger (which includes protection of respective organizations to which they may belong). FIG. 2 illustrates some of these features and functions and its relation to security.

While not illustrated in FIG. 2, the privileged debug session steps of which are shown in FIG. 2 is performed during a live session, such as e.g. a WebEx session or a Skype call, or any mode of communication between the debugger and the customer that is closer to real time, hence the term "interactive" in the "Secure Interactive Debug." Thus, the interaction the customer is central to the SID method described herein. How the customer wants to interact with the debugger may vary from customer to customer but preferably remains customer-driven. In some exemplary embodiments, the SID client 112 and SID server 120 may be configured to carry out the live section through an active teleconference session, such as e.g. a WebEx session. However, embodiments of the present disclosure are not limited to the use of teleconference or any other sessions providing display of information (e.g. video or textual). For example, in some embodiments, voice only session may also be sufficient and may be advantageous because customer's company may prohibit the product's administrator from doing so. If at least parts of the communications of the SID method take place over a network, the SID client and the SID server may be configured to encrypt the communication. An exemplary interaction between the debugger and the customer is described in a designated section below.

Prior to the beginning of the method illustrated in FIG. 2, a customer may login into the system, e.g. using the product's proper authentication and interface.

Turning to FIG. 2, the method 200 may begin with step 202 where the customer performs necessary steps to invoke, enable, activate, and/or begin the SID process. Person of ordinary skill in the art would recognize that such steps would be product-specific (i.e. dependent on the design and implementation requirements of a product), all of which steps are within the scope of the present disclosure. As a part of step 202, the SID client 112 receives an input from the customer, e.g. a command or an action or a series of such commands and/or actions, indicating customer's desire to begin a secure login process for the privileged debug session. In response to (i.e. triggered by) such an input, the SID client invokes the secure login process for accessing the privileged debug service. As a part of the secure login process, the SID client performs authentication and authorization of the customer, which could be implemented as shown with steps 204-212 of the method 200 in FIG. 2.

During this authentication and authorization on the customer's side, the customer proves that they have access to the product 110 by authenticating against that product's authentication methods according to the configuration of that product. Depending on the particular resource being requested, the SID client 112 determines whether that customer has the rights to that resource before it allows the customer to grant access to the resource to the debugger. Up to this point, the SID server 120 may or may not be involved, which could be a product's specific design decision. For example, in some embodiments, the SID client 112 on the product 110 may be configured to offer a typical login to their standard CLI and then a special and documented CLI command to begin the SID process, while, in other embodiments, the SID client 112 on the product 110 may be configured to allow the customer to enable a certain network port that a customer can use to directly access the SID server 120.

One way or another, the SID client 112 is configured to take the customer through the product's configured authentication mechanisms that authenticate the customer and determine if they have the initial access privilege or rights before continuing on with the debug session. To that end, in step 204, the SID client requests that login credentials of the customer are provided to the product 110. For example, the SID client may request that the customer enters username and password. In step 206, the SID client receives from the customer a second input comprising the requested login credentials and, in step 208, the SID client proceeds to authenticate the customer using the received login credentials. If authentication is not successful, the SID client terminates the privileged debug session as a failed attempt.

If authentication is successful, then, in step 210, the SID client determines whether the customer associated with the received login credentials has rights (i.e. is authorized) for granting access to the privileged debug service. If the customer is determined to not be authorized, the SID client terminates the privileged debug session as a failed attempt. If authorization is successful, then, in step 212, the SID client generates and present to the customer a challenge string to be provided to the SID server. At this point, the customer has allowed the debugger to access to the privileged debug services and now it is up to the debugger to carry out its' respective authentication and authorization to show that the debugger is authorized to access the privileged debug services.

In some embodiments, the challenge string may identify the product and/or the specific ones of the privileged debug services within that product being requested. The SID server may then use this information to authorize a debugger. In various embodiments, the challenge string may be presented in various manners, such as e.g. displayed on a customer's display and/or played as an audio for the customer and the customer then provides the challenge string to the SID server, or provided directly and automatically (i.e. without direct involvement from the customer) from the SID client to the SID server or/and debugger's device with which the customer is having a live session with.

As the foregoing description illustrates, customer authentication and authorization is another example of the "interactivity" aspect of SID. The customer must technically grant a debugger permission to obtain the privileged debug resources through authentication and authorization. As described above, some products may offer the product's standard CLI first before secure login process/SID can be invoked. In such embodiments, obtaining this CLI neither infers nor explicitly grants a debugger permission to obtain the privileged debug resources. In this CLI example, the product may offer a special command for the SID. When a customer is asked again to authenticate, this special command is invoked. After authentication, the SID client must check to ensure that the customer has the correct privilege levels in their company to grant this permission to a debugger. How the product authorizes the customer for SID is a product design decision. The authentication and authorization at this point in time is a customer giving a debugger the right to proceed with the remainder of the SID process which may result in the possession of the privileged debug resource during the live debug/interactive session.

Although not shown in FIG. 2, in some embodiments, the method 200 may further include providing an alert or a warning indicating that access to the privileged debug service has been requested or that the privileged debug service is in use. Such an alert or a warning could include e.g. a call home event or/and a GUI change to indicate an active session and Simple Network Management Protocol (SNMP) trap, and could remain active for the duration of the privileged debug session. Depending on particular implementation, the SID client may be configured to provide such an alert or a warning at any point during the method 200, e.g. at or after step 202, at or after step 210, etc.

Returning back to the steps shown in FIG. 2, once a customer has been authenticated and authorized and a challenge string has been provided to the SID server, the method may proceed to step 214 where the SID server uses the challenge string to authorize a debugger. Thus, in the SID process, authentication and authorization come in two forms: customer's authentication and authorization and debugger's authentication and authorization. On the debugger side, the debugger must authenticate against its respective authentication server (e.g. authentication server 130), e.g. using login credentials of the debugger within his or her organization. To that end, the authentication server may access the active directory 150 storing login credentials of different debuggers. The SID server 120 will, then, check whether the authenticated user has the access rights to the privileged debug services of the product 110 (e.g. by accessing repository of users and rights 160) to generate a response to the challenge string for the product 110, e.g. in a form of a response string to be provided to the SID client.

While authentication and authorization on the debugger side is shown with a single step 214, this step may include steps similar to steps 204-212 but performed by the SID server with respect to the debugger and resulting in generation of a response string. Since these steps would be obvious to a person of ordinary skill in the art based on the description provided herein, in the interests of brevity, these steps are not repeated here. In addition, step 214 also includes using the challenge string provided to the SID server in step 212 to generate the response string when authentication and authorization of the debugger are successful. For example, the SID server may use the challenge string during the authorization step to identify the actual product and/or privileged debug services in question (i.e. to identify for which product and/or privileged debug service a debugger is to be authorized).

If either authentication or authorization of the debugger is not successful, then the SID server does not generate a response string. In this case the SID case may be configured to return an error or any indication that authentication and/or authorization has failed. The SID process may then terminate as a failed attempt.

Preferably, the response string generated by the SID server includes a cryptographic signature authorizing the particular debugger that authenticated with the SID server to access the privileged debug services in question. In an embodiment, such a cryptographic signature may be generated by the root PKI authority 140 in response to the SID server 120 receiving the challenge string and information indicative of the debugger successfully authenticating with the SID server. For example, if the SID server has determined that authenticated debugger has the correct rights to accessing the requested privileged debug services, the SID server may be configured to take the challenge string along with other information and make a request to the root PKI authority server to create a cryptographic signature.

In an embodiment, each of the challenge string and the response string comprise a Base64-encoded binary string, or any other pattern/representation that can be easily communicated over a phone-type of communication session. More considerations for implementing challenge and response according to various embodiments of the present disclosure are provided in a designated section below.

In an embodiment, a generic resource access manager, such as e.g. Cisco's EMAN OnRAMP, may be implemented for approving and controlling access to a given resource. In such an embodiment, for the example of Cisco's EMAN OnRAMP, the SID server may use OnRAMP to authorize a Cisco employee (i.e. a debugger) to obtain the response string for a given product. Such a resource access manager may be configured to follow the resource's configured approval process before giving access to the user. In addition, the resource access manager may be configured to track the user and perform re-approval when specific human resource changes occur such as moving to another team or job role changes.

In an embodiment, the SID server may be configured to use the resource access manager or a similar element to group users of the same resources into different categories depending on their job function. For example, a SID server may be configured to support three different user group categories which could be named e.g. as direct, ticketed and special. The "direct" category may be reserved for development and Quality Assurance (QA) engineers directly involved in the development and testing of the product. The "ticketed" category may include users that are Technical Assistance Center (TAC) or technical support personnel. The "special" category may include a subset of direct users who have been placed as security restricted users such as engineers in e.g. a particular Resource and Development Center. One reason for such a distinction may be to provide different levels of actions to the user. For example, the SID server may be configured to not grant customer support users the ability to automate the generation of a response string. Furthermore, a user cannot be authorized in multiple categories for the same product's privileged debug resource.

In some embodiments, each product may have no more than one user group (e.g. OnRAMP user group) associated to each category. A product is not required to have resources associated to every category. In other words, a category does not have to have a resource associated with it.

Returning back to FIG. 2, the response string generated by the SID server as a part of authorization of step 214 shown in FIG. 2 is then provided from the SID server to the SID client. Similar to the provision of the challenge string, in various embodiments, this may be done in various manners. For example, the response string may be e.g. displayed on a debugger's display and/or played as an audio for the debugger and the debugger then provides the response string to the SID client. Alternatively, the response string may be provided directly and automatically (i.e. without direct involvement from the debugger) from the SID server to the SID client and/or to the customer's device used for the SID process. Step 216 illustrates the SID client receiving the response string generated by the SID server. Receiving the response string shows to the customer that the debugger involved in this in interactive debug has appropriate authorization to the privileged debug resource.

The SID client then uses the received string to cryptographically validate the response, as shown with step 218. If validation is not successful, the SID process is terminated as failed. If signature validation is successful, the SID client determines the particular privileged resource being requested and provides the debugger with access to that resource, as shown in FIG. 2 with step 220. In an embodiment, the SID client may be configured to present to the customer identification of the debugger.

Preferably, providing the debugger with access to the privileged debug service in step 220 includes the SID server receiving input from the debugger indicating one or more commands and/or actions to be executed on the privileged debug service, providing those commands and/or actions from the SID server to the SID client (e.g. in any one of the manner described above for providing the response string from the SID server to the SID client), and the SID client ensuring that the indicated one or more commands and/or actions are executed or performed on the privileged debug service. In an embodiment, the privileged debug session, in particular providing the access in step 220 of the session, may include a CLI session, e.g. a secure shell (SSH) session.

In some embodiments, providing the debugger with access to the privileged debug service in step 220 comprises the SID client determining, for each command or action of the one or more indicated commands and/or actions (prior to execution of the command or the action) that the command or the action is allowed for execution during the privileged debug session. The SID server may perform similar determination on its side, e.g. prior to providing the command or action to the SID client. Such embodiments advantageously allow limiting the nature and/or the number of commands/actions that may be executed on the privileged debug service, providing further level of protection for the product 110. For example, a command/action indicating that some or all logs associated with the session should be erased or a command/action disabling the logging application(s) could be on the list of commands/actions that are not allowed, preventing a malicious debugger from covering up the footprints of the session.

If, at any time, the SID session is terminated (e.g. because the customer disables the SID and/or ends all live sessions), the SID client may revoke access privileges of the debugger to the privileged debug service, as shown with step 222 in FIG. 2. The SID server may also be configured to revoke access privileges of the debugger, e.g. when the debugger fails authentication or authorization. Revoking the access privileged ensures that the customer is returned back to a safe and secure state where the debugger does not have access to the privileged debug services.

In some embodiments, the SID client and/or the SID server may be configured to monitor whether a timeout occurs at one of more steps of the SID process, such as e.g. idle session and login. Preferably, anything prior to beginning the SID login process is also monitored for timeouts such as in a product's normal CLI session. Where or how timeouts are designed is product specific and would be apparent to a person of ordinary skill in the art based on the description provided herein. Importantly, when timeout is detected, the SID client and/or the SID server may be configured to end the SID process, possibly revoking the access privileges already granted, in order to ensure that the customer is returned back to a safe and secure state where the debugger does not have access to the privileged debug services. In various embodiments, timeouts do not have to necessarily come in the form of the transpiration of time but could also be defined in terms of e.g. reaching of a limit such as a limit place on storage. One goal of implementing the timeouts is to prevent the granting of infinite or excessively long amount of time to any point in the process or any resource.

In an embodiment, the SID client and/or the SID server may be configured to stop the SID process when any step of the customer's and debugger's authentication or authorization is not successful, also ensuring that the customer is returned back to a safe and secure state where the debugger does not have access to the privileged debug services.

In some embodiments, the SID client and/or the SID server may log (i.e. store) or assist in logging various information related to the privileged debug session, including information related to the failed attempts, such as e.g. one or more of commands and/or actions executed during the privileged debug session, preferably accompanied by one or more time stamps associated with the execution of the one or more commands and/or actions, the login credentials of the customer, an identification of the debugger, one or more time stamps associated with invoking the secure login process for the privileged debug session, and a length of the privileged debug session. Such embodiments advantageously allow tracking of every command type, action taken or settings changed in the privileged debug service. In some embodiments, the logged information may then be used in digital forensics, described in greater detail in a designated section below.

The following section describes an exemplary "ideal" customer interaction during the SID process as shown in FIG. 2.

Exemplary Interaction Between the Debugger and the Customer

SID is a process. As such, SID may control the secure login while adding guidelines and rules to the interaction with the product and customers. An example of a customer interaction scenario may begin with a debug engineer (i.e. a debugger), John Smith, working on a problem of a product of Customer ABC for a long time. During this period, John has collected numerous detailed tech-supports and discussed the problems with the respective engineering teams. However, neither John nor the respective engineers found the root cause of the technical problem with the product and have agreed that a live debug with the customer is necessary in order to make forward progress on the reported defect. They are simply stumped and must enter the customer's system (i.e. access the privileged debug services of the product) in order to carry out a deeper investigation.

John has discussed the status of the issue with the Customer over email or phone call and made a request to the customer to dig deeper into their system by activating a privileged debug session. At this point, John further explained to the Customer that the privileged debug session will end at the termination of the meeting and highlighted that it is important that the Customer representatives with correct credentials to grant SID privileges be present at the meeting. After the Customer agreed, a time for having a live SID session has been arranged. John ensured that either he or another appropriate debugger can be present at the arranged session.

The meeting time has now arrived and all required attendees have entered the meeting. John introduces each person on the debugger side with a quick description of their role in the case. For example, John introduces Scott Phuong as a software engineer representing a certain component of the product, e.g. a Cisco Integrated Management Controller (CIMC) component of a server. John allows the Customer and their attendees to introduce themselves and ensures the meeting does not have any extra or missing representatives before he begins.

At this point, John may recap the status in the meeting if necessary. Otherwise, John instructs the Customer to open up a CLI session via SSH to the Customer and to enter the administrative credentials. John instructs the Customer that he will need to gain the bash shell of the CIMC component and to do that the Customer must type these commands. Just before John invokes the SID process, John explains to the Customer that he is about to invoke a secure login process to obtain the bash shell as a super user or root user and instructs the Customer to type the command invoking the process.

The SID login process may begin when the Customer types the command and hits enter. John, then, explains that the Customer acknowledges that he is allowing the debugger (e.g. John and/or other debuggers present at the meeting) to enter a privilege session, assures him that he will explain every command that is executed and that the Customer allows the debugger to do this by entering the customer's credentials that will grant access to the privileged debug services. The Customer enters his credentials and his credentials contain the correct privilege levels to grant SID access. At this point, the SID login process produces a challenge string. John describes to the Customer that at this stage John will prove to the Customer that he has the correct credentials as well. John asks the Customer to copy the challenge string into the chat window of the live session (in this example, WebEx).

Once John has the challenge string, he logs into one of the SID servers using his debugger credentials and selects the correct option to produce a response. The SID server asks for the challenge string. John provides the challenge string and the SID server examines it and determines if John is authorized to sign this challenge string. If John has the rights to sign the string, the SID server will create the appropriate request and provide it to the root PKI authority server which will then generate a response string and provide it to the SID server. Once the SID server has the response, it will display it to John. At this point, John copies the text to the chat window and instructs the Customer to paste the context back to CLI session.

The SID client in the product checks the response and if the response checks out correctly, the SID will report success and print out John's username and full name to the screen to reassure the Customer as well as log this session to the product's log or auditing system or repository.

John tells the Customer that at this point the privileged session is achieved and the debugging or investigation begins. The interaction at this point is just like it was earlier where John or another authorized debugger asks the Customer to type a command while explaining what the command does and why. For example, Scott may ask the Customer to figure out which directory the Customer is in by typing "pwd". Then, Scott may instruct the Customer to type "cat somefile.txt" and explain that the command looks at the content of this file to give him a general status report of an application XXX which Scott suspects is involved in the customer's reported defect. This process of communication occurs until the meeting ends or the debuggers have found enough data to root cause or solve the issue.

At this point, John ask the Customer to type exit until the initial SSH session has closed and ensures that all SSH sessions in the meeting are appropriately terminated before thanking the Customer for their time and ending the meeting.

In the above-described interaction, one important aspect of the interaction is that the Customer has a great degree of control. The main manifestation of this control is that the Customer has to grant the Debugger control of the product's privileged debug resource. The Debugger cannot access the privileged resource without the Customer (and vice versa). Another manifestation of Customer's control is that the Customer is the one that ultimately controls execution of commands or actions on the privileged debug resource (because the Customer is typing/providing these commands/ actions to the privileged debug resource). If the Customer did not like the explanation, they will not type or execute the command. If the Customer wants the debugger to type, the debugger should explain that the Customer should do it instead in order to maintain control. However, the debugger is in the business of providing customer satisfactory support and thus, even if after providing all the warnings, the Customer still wishes the debugger to type, then providing satisfactory support to the Customer is important. Some options are for the debugger to ask the Customer to still be part of the meeting and actively look at every action taken to their systems.

Another important aspect is the interaction with the Customer. The debugger is explaining to the Customer what action is being performed and the reasons for each action, in order to be transparent to the Customer and to ensure that the Customers are active participants. Such explanations also offer a level of security and trust. In a potential social engineering attack scenario, a malicious, unsophisticated and fake debugger representative will likely lack clarity and certainty in their explanations and discussions with the Customer. Thus, explaining to the Customer these actions in detail provides a relatively minor but important level of trust and security.

Challenge and Response Considerations

Challenge and response provide the backbone to the SID process. Therefore, some exemplary and optional considerations in implementing this feature are now provided.

Product design engineers should carefully determine the challenge string and which of their security keys (e.g. the RSA key pairs such as e.g. Abraxas release keys) are associated with that product.

Strength of the security involved in the SID login process relies on the composition of a challenge string. Therefore, the customer side (SID client) should be equipped or configured to generate a challenge string taking into considerations factors such as e.g. account replay attacks, attack surface, threat surface, brute force attacks and vulnerability surface. Each component in the challenge string may have a functional purpose, a security related purpose, or both. Some of the possible components for a challenge string are described below. The order in which these components may appear in a challenge string is product specific except where it is otherwise stated.

In general, in bits, the size of the entire challenge and response string excluding the cryptographic signature must be larger than the size of the cryptographic keys used to produce the signature. Because the non-signature portion of the response key may not have a guaranteed size, it may be preferable to ensure that the challenge size, in bits, is larger than the cryptographic keys.

In some embodiments, the first four bytes of a challenge string may be a 32-bit checksum of individual and singular bytes of the remaining bytes of the challenge string. This may help ensuring that the user's input is not faulty and to a very minimal extent not malicious to the SID server.

In some embodiments, the second four bytes of a challenge string may include the version identification (ID). The version ID essentially identifies the resource or set of resources which is often, if not always, tied to a particular product, a group of products or a product family. One purpose of the version ID may be to identity the various aspects of a challenge string such as e.g. expected binary length of the string, its expected composition, as well as a byte- or bit-wise order of the components that make up a challenge string. Such implementation also helps to make SID flexible and portable to various product's requirements across product's manufacturer.

In some embodiments, a challenge string may include a product family ID. If a set of products will use the same challenge composition, the product family ID may be used to help identify the group of products that may use the same security (e.g. Abraxas release) key(s).

In some embodiments, a challenge string may include a product ID that uniquely identifies the product. For example, both the product family ID and product ID may be used to identify the resource group (e.g. OnRamp resource group) for user access check and the security key(s) to use.

In some embodiments, a challenge string may include a cryptographic nonce. Using a nonce ensures that the challenge string that was just produced will never show up again. Forming a nonce correctly is very important to ensuring the same challenge string will not show up again.

One component to consider when forming a nonce may include a request counter. This may be a monotonic counter that either increases or decreases on each challenge string creation. In an embodiment, the request counter could be randomly initialized on first use to prevent predictability, but, once initialized, the request counter strictly changes on each request. Once the counter decides to either monotonic increase or monotonic decrease it should not change its decision in the product's life span. Therefore, depending on the size of the request counter, the SID client may determine its size of increase or decrease to ensure that the number will not wrap around easily in the product's life span. If the counter is too small, it may wrap around within a short amount of time even under normal usage.

Another component to consider when forming a nonce may include a real time clock. Using a time component makes it excessively difficult for the same string to show up again even if the request counter does wrap around.

Yet another component to consider when forming a nonce may include the OS's uptime counter. This is usually a monotonic counter in seconds especially in Linux OS. This plays the same role as the real time count, i.e. it provides another layer of difficulty if a malicious user is trying to force the system to create a known challenge and response string.

Returning to the components to consider in generating a challenge string, in some embodiments, a challenge string may include random data. Without a sufficient length to random data, the challenge string can become predictable. The longer the random data is, the harder a replay attack is and the harder a malicious user can predict the next challenge string.

In some embodiments, a challenge string may include a product Instance ID, which includes a string, a binary encoding, or anything that uniquely identifies that instance of the same product. A typical product instance ID is the serial number of the product or a serial number of a specific component on that product such as the component that executes SID (i.e. the SID client). An important trait of the product instance ID is to ensure that it is immutable by software. For example, the serial number is burned or fused into the hardware and thus it is not modifiable. One reason for using a product instance ID is to ensure that the challenge string is tied to this instance of the same product to reduce the attack surface to this individual instance instead of having all instances of the same product be vulnerable.

In various embodiments, components of the challenge string do not have to be grouped together and may be distributed within the challenge string unless required otherwise. For example, if product engineers determine that the random string is 128 bits in length; not all 128 bits have to be in consecutive order: the engineer could design that bits 0 through 3 will be at byte 20, bits 4 to 100 start at byte 35 and so on forth.

Turning now to a response string, as previously described herein, in some embodiments, a response string may be Base64 encoded. The format of the Base64 encoding is consistent with OpenSSL where the entire string can cross multiple lines. In addition, the response string is typically longer than the challenge string because the signature and the signature header are added to the data that is signed.

In various implementations, a particular composition of a response string can be unique to a product or, alternatively, more than one product can use the same composition of a response string. The composition of a response string may be not tied to a product, but instead to its own compositions. If a product engineer determines an existing composition of a response string meets the product's requirements, the response string format (i.e. composition) can be used.

A response string is comparable to a challenge string in its flexibility but, to ensure proper SID specification adherence, it may include a few more constraints.

Some of the possible components for a response string are described below. Unless otherwise state, the order in which the components show up is product- and/or response string version ID-specific.

In some embodiments, the first 4 bytes may include the version ID, which could be conceptually similar to the version ID of a challenge string. Using the version ID in a response string allows the product to identify the composition of a response string as well as how to parse it.

In some embodiments, a response string may include data indicative of a full or a partial name (possibly, username) of the debugger that performed the SID response retrieval operation.

In some embodiments, a response string may include data indicative of a full or a partial name (possibly, username) of the debugger that initiated production of the response.

In some embodiments, a response string may include an RSA cryptographic signature, such as e.g. Abraxas cryptographic signature, which also includes the cryptographic signature's header. Preferably, these portions are not split apart and the entire component must exist as a whole, e.g. at the end of a response string.

In some embodiments, a response string may include the time of response creation, which could then be advantageously used for logging and auditing.

Response String Generation Process

When a debugger logs in and chooses to generate a response string with a challenge string, SID begins the response string creation process. After the challenge string is provided to the SID server (e.g. the debugger inputs the challenge string), the challenge string may be converted from Base64 to a binary string. In some embodiments, the SID server may be configured to perform a "sanity" check on the binary string, which may involve both the basic SID checks as well as check associated with that specific challenge string identified by the challenge string's version ID. As the sanity check is performed, the SID server may parse the binary string extracting the necessary information to perform its next steps. If the sanity check fails, the entire SID process aborts. If this sanity check passes, the SID server may use the parsed information from the challenge string and a set of configuration files to determine the resource access manager resource (e.g. OnRAMP resource) and security keys to use.

In some embodiments, the configuration files may include a set of files that help guide SID to using the correct parameters or options for a particular challenge string. It is advisable to check all configuration files before reading them, in order to ensure the integrity of the file is not compromised by using cryptographic signature validation with the public key.

With information from the configuration files, the SID server has all the information necessary to perform the remaining steps. At this point, the challenge string is in binary form, sanitized and parsed. The SID server may then issue a Lightweight Directory Access Protocol (LDAP) inquiry to determine if the user is authorized, e.g. if the user is authorized in one of the user access groups. Optionally, if a user is found in a specific group, the SID server may prompt for more information or disallow a specific feature of SID.

If the user has access rights, then SID proceeds to create the binary form of the response string that is required for the challenge string. In some embodiments, the binary form of the challenge string and the response string may be combined into one binary array. This combined binary array may then be the data provided to the root PKI authority server with the appropriate release key name for the signature creation. The root PKI authority server will perform the cryptographic operation and return the signed data to the SID server. The SID server can then encode only the binary form of the response string into base64 and add a 32-bit hexadecimal checksum to the end of the line to produce a response string that is to be provided to the SID client.

Response String Validation Check

As described above, after the SID client in the product generates the challenge string, the client waits for a response string up to a timeout value. If the SID client receives the response string, it may be configured to perform a "sanity" check by checking each line with the hexadecimal value, combine all lines into one line, converting it to a binary form, and performing [further] sanity checks in binary form. If the sanity check passes, the SID client may form a single binary array combining the binary form of the challenge string with the binary form of the response portion. The SID client may then proceed to cryptographically validate the signature against the internally and securely stored public key. Part of signature validation is public key validation. The product's public key validation happens first and essentially involves cryptographically validating the public keys against the root PKI authority's primary rollover public key. If the product key check passes, then the product keys are loaded and used to form the final validation check against the entire buffer. If these validation checks passed, the SID client parses the response string to extract the information it needs to provide the privileged session. If the username and full name of the debugger is present, the SID client may display it on a screen for the customer. The SID client may then perform the necessary setup steps for the privileged debug resource and finally grant the debugger access to that resource.

Design for Digital Forensics

An important, but often forgotten security feature, is the ability to perform digital forensics especially in the event in understanding an attack. Digital forensics is a branch of forensic science encompassing the recovery and investigation of material found in digital devices, often in relation to computer crime. Design for digital forensics is the set of design principles and implementations that allow for an engineer or digital forensic scientist to factually explain every behavior of the system within a given time range. An engineer usually designs for debug in order to accurately identify and fix a defect, but few engineers design a system in order to accurately explain every behavior of the system especially in the context of a crime which often is in the absence of a defect. In various embodiments, the SID server and client may be configured to implement various digital forensics features as described below.

As previously described, the SID client and/or SID server may be configured to log every command type, action taken or settings changed in the privileged debug service with complete and accurate timestamps. The SID client and/or SID server may also be configured to log the debugger's username and a full name of the person that performed the challenge and response process.

The logged data may be stored for as long as particular implementation and/or the product design allow. The length of this history may be at a discretion of the product design engineers.

Generating an alert or a warning described above, e.g. when the privileged debug session is activated, is also an example of digital forensics features. In some embodiments, the SID should report all active privileged debug sessions and pertinent session information such as username, time of activation, length of session thus far, etc. . . . .

As product engineers determine the appropriate design for digital forensics, it is important to recognize and protect against the ability for a SID user or attacker to enter the system and circumvent or disable the product's infrastructure used for digital forensics. Circumvention or disablement come in many forms such as e.g. disabling the application responsible for logging, removing log files, or editing log files. Potential solutions to try to protect against or mitigate the effects of a user trying to cover up their footprints include configuring the SID server and/or the SID client for preventing the user from disabling the logging application, placing the stored logs into a hardware base repository that cannot be erased, sending the log messages to multiple servers or locations making it harder to cover the track because the information is duplicated to multiple external entities, modifying the privileged resource provider code to prevent certain commands from being executed, creating a special file system in the Operating System (OS) that prevents a user from erasing data, use SELinux or SMASH to prevent a user, even root-user, from erasing forensic data (this may require software changes in the OS to prevent SELinux or SMASH from being disabled in production code), and providing a non-root user (which may be sufficient for some products).

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to the secure interactive debug described herein. This may be inclusive of appropriate algorithms and communication protocols that allow for the effective exchange of data or information.

In one implementation, SID server and SID client described herein may include software to achieve (or to foster) the secure interactive debug functions discussed herein, where the software may be executed on one or more processors to carry out the functions. This could include the implementation of instances of programming logic and/or any other suitable element that would foster the activities discussed herein. Each of the SID client and SID server described herein can have an internal structure (e.g., a processor, a memory element, etc.) to facilitate some of the operations described herein. In other embodiments, these functions related to the secure interactive debug may be executed externally to the customer and/or debugger sides, or included in some other network element to achieve the intended functionality. Alternatively, SID server and SID client may include software (or reciprocating software) that can coordinate with other network elements in order to achieve the functions related to the secure interactive debug described herein. In still other embodiments, one or several devices may include any suitable algorithms, hardware, software, components, modules, interfaces, or objects that facilitate the operations thereof.

In certain example implementations, functions related to the secure interactive debug described herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the secure interactive debug functionality described herein. Additionally, each of these devices may include a processor that can execute software or an algorithm to perform the secure interactive debug as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of the secure interactive debug, as potentially applied to a myriad of other architectures.

It is also important to note that the steps in the FIGUREs illustrate only some of the possible scenarios that may be executed by, or within, SID functional elements described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the SID server and SID client in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method for ensuring secure access by a debugger to a privileged debug service for trouble shooting a product of a customer during a privileged debug session, the secure access provided via an intermediate secure interactive debug (SID) server located at a remote location from the product, the method comprising steps of:
   in response to receiving a first input comprising a command or an action to invoke a secure login process, invoking the secure login process for accessing the privileged debug service;
   requesting that login credentials of the customer are provided;
   receiving a second input comprising the login credentials of the customer;
   authenticating the customer using the login credentials of the customer;
   upon successful authentication of the customer, determining whether the customer has rights for granting access to the privileged debug service;
   upon positive determination, generating at the product a challenge string to be provided to the SID server;
   receiving at the product a response string indicating that the debugger has successfully authenticated with the SID server for accessing the privileged debug service;
   validating at the product the response string;
   upon successful validation, providing the debugger with access to the privileged debug service by receiving input from the debugger indicating one or more commands and/or actions to be executed on the privileged debug service and executing the one or more commands and/or actions on the privileged debug service;
   wherein by virtue of the remote location of the server and the product the server can support the privileged debug service for other products at other locations remote from the server.

2. The method according to claim 1, further comprising logging the one or more of commands and/or actions executed during the privileged debug session accompanied by one or more time stamps associated with the execution of the one or more commands and/or actions, the login credentials of the customer, an identification of the debugger, one or more time stamps associated with invoking the secure login process, and a length of the privileged debug session.

3. The method according to claim 1, wherein providing the debugger with access to the privileged debug service comprises determining, for each command or action of the one or more commands and/or actions, prior to execution of the command or the action, that the command or the action is allowed for execution during the privileged debug session.

4. The method according to claim 1, wherein the privileged debug session comprises a live session between the debugger and the customer.

5. The method according to claim 4, the method further comprising: revoking access privileges of the debugger to the privileged debug service upon termination of the live session.

6. One or more non-transitory computer readable storage media encoded with software comprising computer executable instructions and, when the software is executed, operable to carry out a method for ensuring secure access by a debugger to a privileged debug service for trouble shooting a product of a customer during a privileged debug session, the secure access provided via an intermediate secure interactive debug (SID) server located at a remote location from the product, the method comprising steps of:
in response to receiving a first input comprising a command or an action to invoke a secure login process, invoking the secure login process for accessing the privileged debug service;
requesting that login credentials of the customer are provided;
receiving a second input comprising the login credentials of the customer; authenticating the customer using the login credentials of the customer; upon successful authentication of the customer, determining whether the customer has rights for granting access to the privileged debug service;
upon positive determination, generating at the product a challenge string to be provided to the SID server;
receiving at the product a response string indicating that the debugger has successfully authenticated with the SID server for accessing the privileged debug service;
validating at the product the response string;
upon successful validation, providing the debugger with access to the privileged debug service by receiving input from the debugger indicating one or more commands and/or actions to be executed on the privileged debug service and executing the one or more commands and/or actions on the privileged debug service;
wherein by virtue of the remote location of the server and the product the server can support the privileged debug service for other products at other locations remote from the server.

7. The one or more non-transitory computer readable storage media according to claim 6, wherein the method further comprises providing an alert or a warning indicating that access to the privileged debug service has been requested or that the privileged debug service is in use.

8. The one or more non-transitory computer readable storage media according to claim 6, wherein the method further comprises logging the one or more of commands and/or actions executed during the privileged debug session accompanied by one or more time stamps associated with the execution of the one or more commands and/or actions, the login credentials of the customer, an identification of the debugger, one or more time stamps associated with invoking the secure login process, and a length of the privileged debug session.

9. The one or more non-transitory computer readable storage media according to claim 6, wherein providing the debugger with access to the privileged debug service comprises determining, for each command or action of the one or more commands and/or actions, prior to execution of the command or the action, that the command or the action is allowed for execution during the privileged debug session.

10. The one or more non-transitory computer readable storage media according to claim 6, wherein the response string comprises a cryptographic signature.

11. The one or more non-transitory computer readable storage media according to claim 6, wherein the privileged debug session comprises a live session between the debugger and the customer.

12. The one or more non-transitory computer readable storage media according to claim 11, wherein the method further comprises:
revoking access privileges of the debugger to the privileged debug service upon termination of the live session.

13. A system for ensuring secure access by a debugger to a privileged debug service for trouble shooting a product of a customer during a privileged debug session, the secure access provided via an intermediate secure interactive debug (SID) server located at a remote location from the product, the system comprising:
at least one memory configured to store computer executable instructions, and
at least one processor coupled to the at least one memory and configured, when executing the instructions, to:
in response to receiving a first input comprising a command or an action to invoke a secure login process, invoke the secure login process for accessing the privileged debug service;
request that login credentials of the customer are provided;
receive a second input comprising the login credentials of the customer;
authenticate the customer using the login credentials of the customer;
upon successful authentication of the customer, determine at the product whether the customer has rights for granting access to the privileged debug service;
upon positive determination, generate a challenge string to be provided to the SID server;
receive at the product a response string indicating that the debugger has successfully authenticated with the SID server for accessing the privileged debug service;
validate at the product the response string;
upon successful validation, provide the debugger with access to the privileged debug service by receiving input from the debugger indicating one or more commands and/or actions to be executed on the privileged debug service and executing the one or more commands and/or actions on the privileged debug service;
wherein by virtue of the remote location of the server and the product the server can support the privileged debug service for other products at other locations remote from the server.

14. The system according to claim 13, wherein the at least one processor is further configured to provide an alert or a warning indicating that access to the privileged debug service has been requested or that the privileged debug service is in use.

15. The system according to claim 13, wherein the at least one processor is further configured to log the one or more of commands and/or actions executed during the privileged debug session accompanied by one or more time stamps associated with the execution of the one or more commands and/or actions, the login credentials of the customer, an identification of the debugger, one or more time stamps associated with invoking the secure login process, and a length of the privileged debug session.

16. The system according to claim 13, wherein providing the debugger with access to the privileged debug service comprises determining, for each command or action of the one or more commands and/or actions, prior to execution of the command or the action, that the command or the action is allowed for execution during the privileged debug session.

17. The system according to claim 13, wherein the privileged debug session comprises a live session between the debugger and the customer.

18. The system according to claim 17, wherein the at least one processor is further configured to:
   revoke access privileges of the debugger to the privileged debug service upon termination of the live session.

19. The system according to claim 13, wherein the response string comprises a cryptographic signature.

20. The system according to claim 19, wherein the cryptographic signature is generated by a root PKI authority server in response to the SID server receiving the challenge string and information indicative of the debugger successfully authenticating with the SID server.

* * * * *